UNITED STATES PATENT OFFICE.

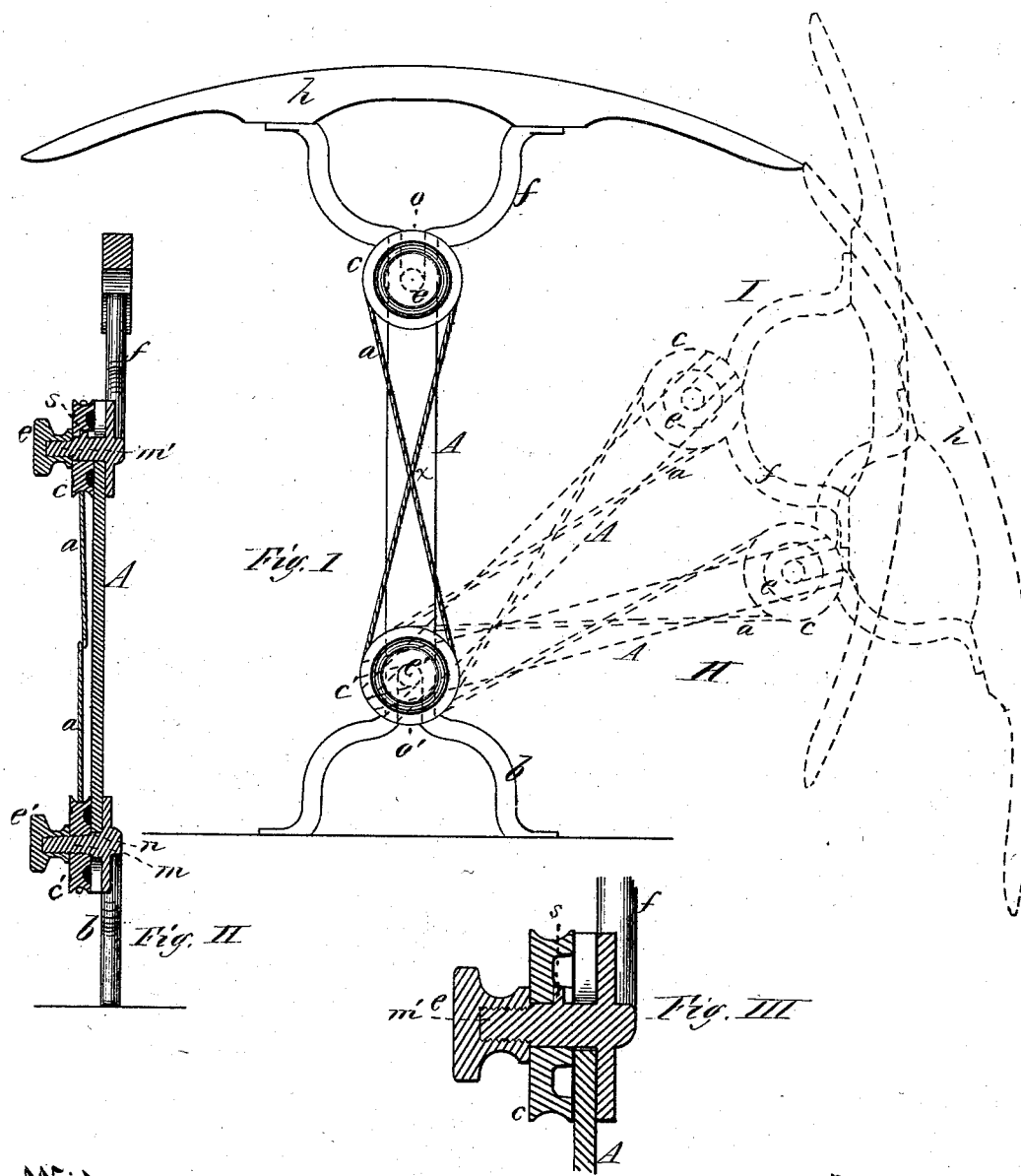

ROBERT F. PAINTER, OF GREENFIELD, MASSACHUSETTS.

IMPROVEMENT IN CARRIAGE-TOPS.

Specification forming part of Letters Patent No. 169,371, dated November 2, 1875; application filed September 3, 1875.

*To all whom it may concern:*

Be it known that I, ROBERT F. PAINTER, of Greenfield, in the State of Massachusetts, have invented a new and useful Improved Adjustable Support for a Carriage-Canopy; and that the following is a full, clear, and exact description thereof, reference being had to the accompanying drawing making a part of this specification and description.

The object of my invention is to accomplish an adjustment of a carriage-canopy to any desired inclination, either forward or backward of the carriage-seat, or above it; and to this end my invention consists of a bar, pivoted to a bearing attached to the carriage-body, or to its seat, upon which bearing is a wheel or grooved pulley, so arranged as to turn freely thereon, or be clamped fast thereto, when desired, the upright bar, however, always swinging freely upon the bearing. At the upper end of the bar is another bearing secured fast to the canopy, with a wheel or grooved pulley secured fast to the bearing, so that it will not turn thereon, but so arranged that the pulley may be clamped against the bar firmly; and a cord or chain passed around both pulleys, and crossed between them, is made fast to each pulley, and the whole operating as hereinafter described.

Figure I is a side elevation of the device. Fig. II is a vertical section of the same at line B; and Fig. III is a similar section enlarged through the upper end of the device.

In the drawing, A represents the upright bar, which is pivoted upon the bearing $m$, so as to turn freely thereon, said bearing being attached or secured firmly, in any convenient manner, to the carriage-body, or to its seat, but in the present example made upon a bracket-iron, $b$. The bearing is threaded at the end, and is also provided with a shoulder, $n$, with a grooved pulley, $c'$, fitted to the bearing outside the shoulder, and a thumb-nut, $e'$, turned upon the end of the bearing, which nut may, at any time, be turned in against the pulley $c'$ to clamp it against the shoulder $n$, so that the wheel or pulley will not then turn upon the bearing, but will leave the bar A perfectly free to turn. At the upper end the bar A is pivoted to the bearing $m'$, which is made, in the present example, upon the bracket-iron $f$, but which may be attached to or made upon the canopy $h$ in any convenient manner. A grooved pulley, $c$, preferably of the same size as the other, is made fast to this bearing $m'$ by a feather and groove, $s$, or by any convenient means; and the bearing is threaded at the end with a thumb-nut, $e$, turned thereon, so that it may, when necessary, be turned in against the pulley $c$ to clamp it firmly against the bar A, and when so clamped the bar cannot move upon the bearing $m$; but the bar, the bearing, and the grooved pulley will then all move together, whenever the bar is turned in either direction upon the bearing $m$ at the lower end. A cord or chain, $a$, is passed over both grooved pulleys $c$ and $c'$, being crossed between them at $x$, as shown in Fig. I, and this cord or chain is secured fast to the upper pulley $c$ at the point $o$, and to the lower pulley $c'$ at $o'$.

The operation of the invention is as follows: If the bar A be secured in an upright position, as shown in Fig. I, by clamping both pulleys $c$ and $c'$ it may be moved into any other desired position, as at I, by unclamping or loosening the upper nut $e$ and pulley $c$. In this movement the two pulleys $c$ and $c'$ being of the same size, the lower one being clamped fast to its bearing $m$, and the upper one $c$ unclamped from the bar, as the latter is moved backward the cord or chain $a$ causes the upper wheel to move at the rate of two entire revolutions around the axis of its own bearing $m'$ while said bearing $m'$ was making one revolution around the lower bearing $m$, as a pivot; consequently when the bar A reaches the position shown in dotted lines at I, or one-eighth of an entire revolution around the lower bearing $m$, the upper pulley $c$ will have made one-fourth of a revolution around its own axis, (said rotary movement being caused by the chain or cord $a$ made fast to both pulleys,) and the canopy $h$ will, of course, be brought into a position at right angles to its position shown in black lines; whereas, if the upper wheel or pulley $c$ be clamped and the lower one unclamped, and the bar A were moved back to the position shown at H, which movement is the same as in the ordinary pivoted devices, the canopy $h$ would not even then reach a position at right angles to its position shown in black lines, but would be as shown in dotted lines at H, so that it will be seen that with my device a very short movement of the bar A in either direction, backward or forward, causes a very quick tilting movement of the canopy. In fact, a great variety of movements may be obtained by unclamping both the upper and lower pulleys $c$ and $c'$. When this is done the canopy $h$ may be tilted into any desired position without even moving the bar A, or the canopy may be held in the same horizontal position while the bar is moved either backward or forward. Whenever the canopy $h$ is moved into the desired position both pulleys $c$ and $c'$ should be firmly clamped by turning in the thumb-nuts $e$ and $e'$, and the canopy will be held securely in that position.

It is evident that any other equivalent clamping device may be used instead of the nuts $e$ and $e'$—as, for example, the bearings $m$ and $m'$ may have a threaded hole made in each, and a clamping-screw, provided with a shoulder, to be forced against said pulleys turned therein.

Having thus described my invention, what I claim as new is—

The combination of the bar A, the bearing $m$ attached to the carriage, and the bearing $m'$ attached to its canopy, the pulleys $c$ and $c'$, the cord or chain $a$, and clamping devices to clamp said pulleys, substantially as herein described.

ROBERT F. PAINTER.

Witnesses:
EDWARD PAINTER,
HENRY BARBER.